United States Patent Office 3,277,733
Patented Oct. 11, 1966

3,277,733
CINEMATOGRAPHIC APPARATUS
André Victor Léon Clément Debrie, 131 Avenue de Malakoff, Paris, France
Filed Jan. 31, 1964, Ser. No. 341,713
Claims priority, application France, May 17, 1963, 935,192
6 Claims. (Cl. 74—207)

This invention relates to cinematographic apparatus, and particularly to projectors. More specifically, the invention is concerned with a particular design of motor with which the apparatus is equipped, and is also concerned with the control of these motors for transmitting the movement of their shafts to those parts of the apparatus which must be driven by the said motors.

According to one feature of the invention, the apparatus is equipped with a constant-speed electric motor suspended in the casing of the said apparatus, and a control means accessible to the operator enables the motor to be pivoted about its axis of suspension in such a way that a roller carried by its shaft is capable of coming into contact with a form of cup connected to a pulley adapted to rotate about a fixed axis.

The shaft of the electric motor preferably always rotates in the same direction and the control means is designed in such a way that the motor rocks to one side or the other of a mean uncoupled position, the rocking to one side ensuring the direct driving of the said cup, while the rocking to the other side ensures the driving of the said cup in the opposite direction, by means of an intermediate roller between that which is carried by the motor shaft and the cup.

According to another feature of the invention, in addition to the apparatus being equipped with a constant-speed motor, it has a variable speed motor, the control means accessible to the operator being such that the two motors are not able simultaneously to drive the cup connected to the pulley.

In one advantageous constructional form, the variable speed motor is also suspended in the casing of the said apparatus and the same control means which ensure the rocking of the constant-speed motor permits the variable speed motor to be rocked about its suspension shaft, so that the latter is able to drive the said cup when the constant-speed motor is in the mean uncoupled position, but is not able to drive this cup when the constant-speed motor is in one or other of the inclined positions.

Other features of the invention will become apparent from the following description made with reference to the accompanying drawings, which is given by way of example, and in which.

Figure 1:
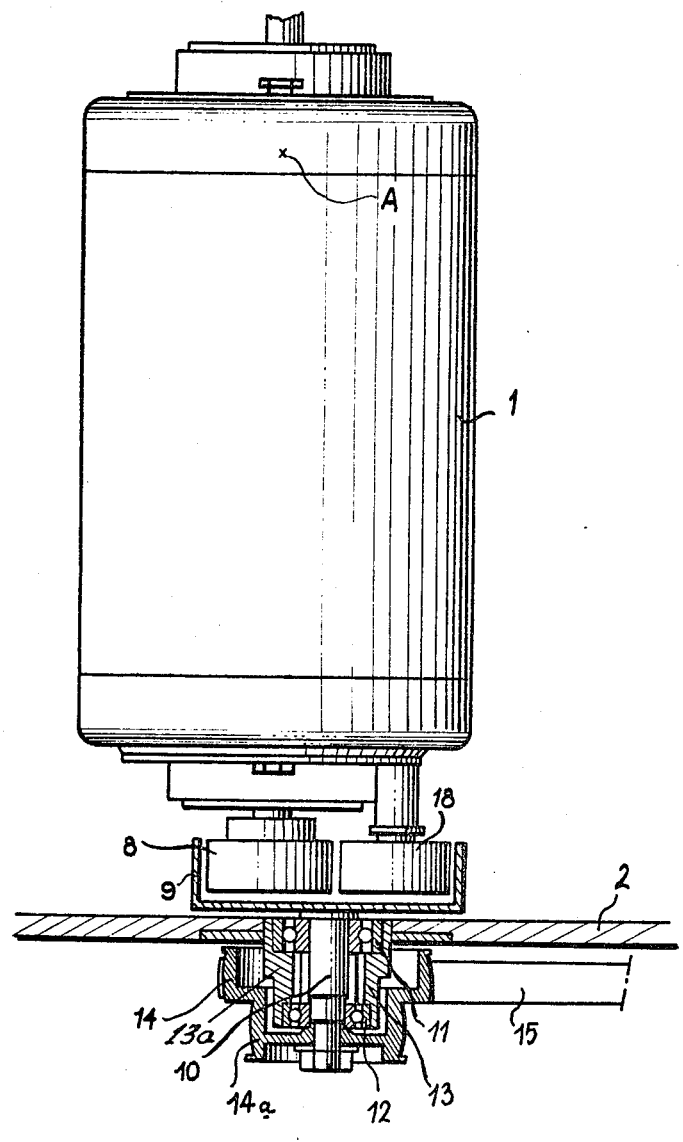
FIGURE 1 is a part-sectional view of a motor and of the transmission associated with this motor.
Figure 2:
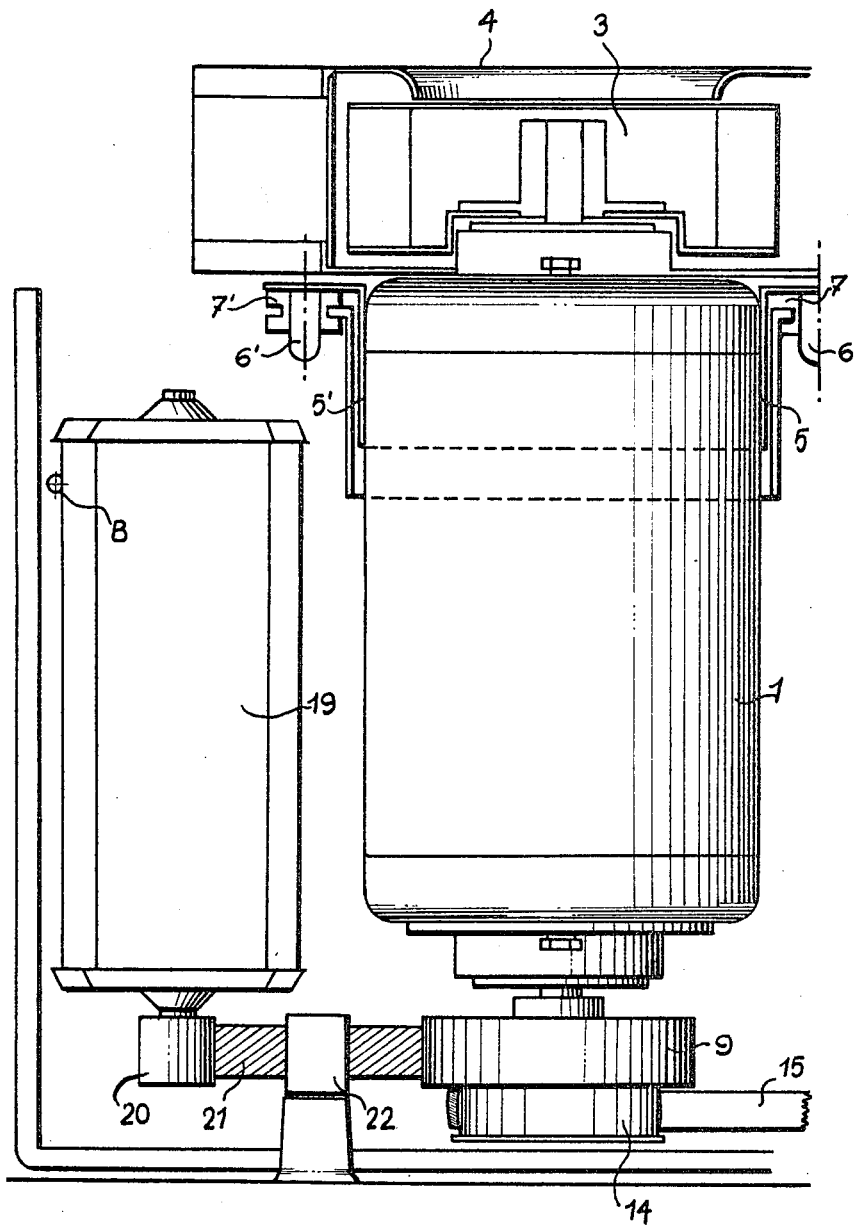
FIGURE 2 shows the association of a constant-speed motor according to FIGURE 1 with a variable speed motor.

In FIGURE 1, the reference 1 indicates a constant-speed electric motor intended for the equipment of a cinematographic apparatus, of which a plate connected to the casing of the apparatus is indicated at 2. This motor will for example be a motor designed to permit the unwinding of a film at 24 frames per second. Furthermore, it will advantageously serve for driving a fan 3 in a conduit 4, as shown in FIGURE 2, in order to ensure the cooling of the essential parts of the cinematographic projection by means of a suitable air circulation produced by this fan.

The motor 1 is suspended from a fixed part of the apparatus. To this end, the casing of the motor is secured to brackets 5, 5' which carry pivots 6, 6' perpendicular to the motor shaft. These pivots are engaged in fixed parts 7, 7' in such a way that the motor can pivot about a horizontal axis A parallel to the plane of FIGURE 2.

That end of the shaft of the motor 1 which is opposite that which carries the blades 3 of the fan carries a roller 8, consisting for example of rubber. This roller, under the action of a control means which will hereinafter be described, is adapted to co-operate with a cup 9 when the motor pivots about the horizontal axis A as defined above.

Figure 4:
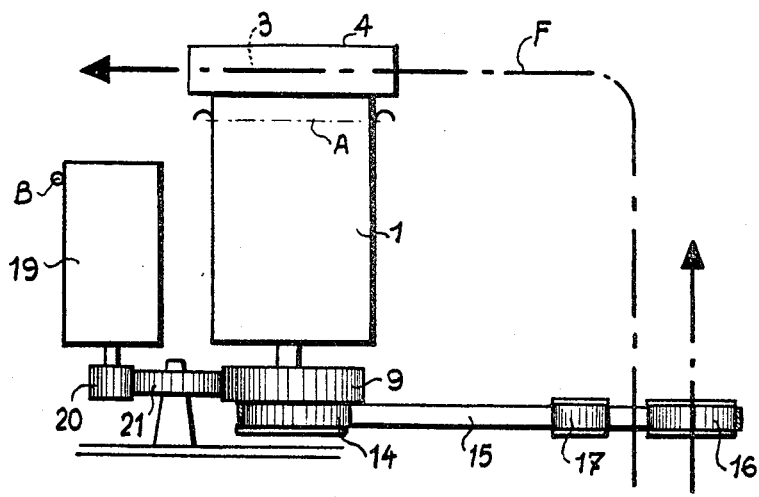
FIGURE 4 shows diagrammatically the arrangement of the two motors in a cinematographic projection apparatus.

The cup 9 is secured to a shaft 10 which is journalled in ball bearings 11, 12, of which the outer races are connected to a part 13 fixed to the plate 2 of the projector casing. Furthermore, the shaft 10 carries a pulley 14 which, in the example illustrated in FIGURE 1, is in two parts 14 and 14a of different diameters in order to obtain two different speeds. Running over the pulley is a belt 15, which runs at the other end over another pulley 16 (FIGURE 4) with possible interposition of a tensioning roller 17.

When the motor pivots about the horizontal axis A in a direction opposite to the foregoing, the roller 8 may also co-operate with a second roller 18 which is adapted to be slightly displaced under the force exerted by the roller 8 in order to co-operate with the cup 9. Thus the shaft of the motor 1 can either directly drive the cup 9, or it can drive the latter through the intermediary of the roller 18, depending on whether the motor rocks to one side or the other about the axis A, with respect to a mean uncoupled position, which is preferably a vertical position, as shown in FIGURE 1. The cup 9 can thus be turned in one direction or the other, while the motor shaft always turns in the same direction.

According to another feature of the invention, the apparatus is equipped with a second motor 19 of the variable speed type. This motor has a direction of rotation which can vary electrically. It is also suspended from a fixed part of the apparatus so as to be capable of pivoting about a horizontal axis B, which is preferably orthogonal to the rotational axis A of the first motor. The shaft of said motor carries at its end a roller 20, consisting for example of rubber, which is adapted to co-operate with an intermediate roller 21 carried by a fixed pivot 22. The periphery of the roller 21 can co-operate with the external face of the cup 9 in order to ensure the driving of the latter when the said roller 21 is itself driven by the roller 20. The direction of rotation of the cup 9 and thus of the pulley 14 depends on the direction of rotation of the shaft of the motor 19.

It is thus seen that the cup 9 associated with the pulley 14 can either be driven internally by means of the motor 1 or externally by means of the motor 19.

Figure 3:
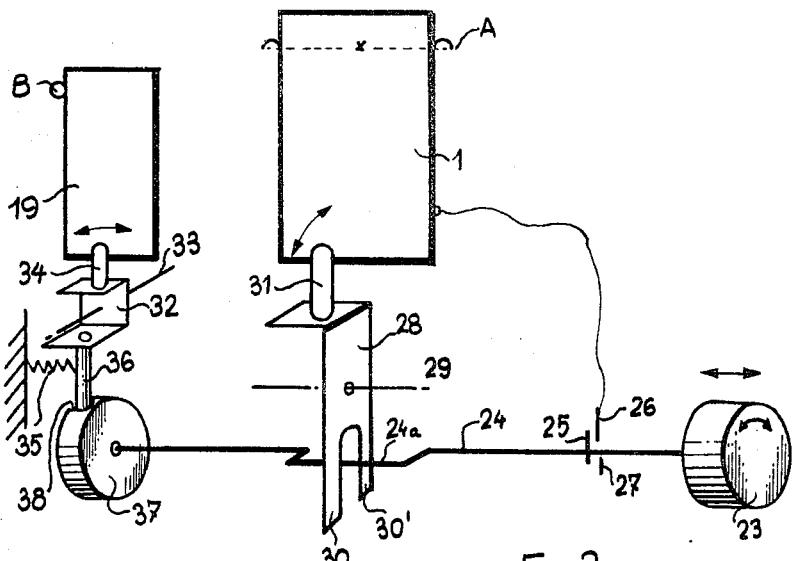
FIGURE 3 is a diagram illustrating the simultaneous control of the two motors according to FIGURE 2.

One embodiment of a possible control means for the two motors is shown diagrammatically in FIGURE 3. Thus control means must be such that the cup 9 can only be coupled with one of the motors at a time, but that it is possible to ensure this coupling with one or other of the motors at will. In addition, it is advantageous for this mechanical control means to serve simultaneously as an electrical control and it is preferred that the constant-speed motor should always rotate, even when it is not coupled to the cup 9. Actually, as indicated above, this motor drives the fan and it is desirable to ensure constant cooling when the apparatus is continuously projecting. The possible circuit for the cooling air of the apparatus has moreover been shown by the arrow F in FIGURE 4.

In the embodiment which is illustrated in FIGURE 3, the control means comprise a button or knob 23 which is accessible to the operator, the said knob being secured to a rod 24. The assembly comprising the knob 23 and the rod 24 is guided in such a way as to be capable of sliding parallel to the longitudinal direction of this rod, and of pivoting as indicated by the arrow on the knobs. The rod 24 carries a contact 25 which can co-operate with a micro-switch 26 during the sliding movement of the rod so as to supply voltage to the constant speed motor 1. It is advantageous to provide a second micro-switch 27 in order simultaneously to cause the supply of voltage to the electrical assembly with which the apparatus is equipped.

The possible rocking movement of the motor 1 about the axis A is effected by means of a stirrup member 28 which is adapted to pivot about a shaft 29, for example, parallel to the general direction of the rod 24. This stirrup member comprises two arms 30, 30' of a U, between which extends a crank part 24a of the rod 24. In addition, the stirrup member 28 comprises on its upper part a pin 31 which acts on the motor in order to cause the latter to rock about the axis A when the said pin pivots about the shaft 29.

The rocking of the variable speed motor 19 is effected by means of a part 32 which is able to pivot about a shaft 33 orthogonal with the shaft 29, in the case where the pivot axis B of the motor 19 is orthogonal with the axis A about which the motor 1 is adapted to rock. The part 32, which carries a pin 34 co-operating with the motor casing 19, is under the action of a spring 35. This spring is arranged in such a way that the lower portion of the part 32, in the form of a finger 36, is constantly bearing against a disc 37 which can be rotated by the rod 24. The periphery of the disc 37 comprises at least one notch or recess 38 into which the finger 36 can extend when this disc has a suitable angular position. To this end, this recess is disposed in a plane substantially perpendicular to the plane of the crank portion 24a of the rod.

It is seen that the first operation consists in causing a sliding movement of the knob 23 and, with the latter, of the rod 24; the effect of this first operation is to supply voltage to the motor 1 and possibly to the electrical circuit of the apparatus. It can be assumed that the motor 1 is normally in the uncoupled position. If it is desired to unwind at constant speed in the normal direction of use, the knob 23 is caused to pivot in the corresponding direction, this having the effect of causing the stirrup member 28 to pivot about the shaft 29 and consequently to cause the motor 1 to rock about the axis A. The roller 8 carried by the motor then co-operates with the cup 9, this ensuring the transmission of the movement in the required direction. Throughout this entire phase, the finger 36 of the first part 32 is not able to engage in the recess or notch 38 of the disc 37, so that the motor 19 is rocked into the uncoupled position.

In order to cause a reverse winding movement, it is sufficient to turn the knob 23 in the opposite direction so that under the action of the stirrup member 28, the motor 1 rocks in the opposite direction about the axis A and its roller 8 pushes the roller 18 against the cup 9. Throughout this entire phase, the motor 19 remains in an uncoupled position.

In order to cause the operation of the variable speed motor 19 instead of the constant speed motor 1, it is sufficient to continue the rotation of the knob 23. The result of this is that the crank portion 24a of the rod 24 no longer co-operates with the stirrup member 28 and that consequently the motor 1 occupies the uncoupled position. On the other hand, the finger 36 carried by the part 32 is engaged in the notch 38, and this causes the pivoting of the said part 32 about the shaft 33. The pin 34 then causes the motor 19 to pivot about the axis B and the roller 20 comes into contact with the roller 21 in order to drive the cup 9. It is obvious that means are provided for ensuring that the motor 19 is under voltage for a certain angular position of the knob 23, other means ensuring the regulation of the speed and the reversal of the direction of rotation of the shaft of the motor 19.

It is to be understood that the embodiments which have been described can be modified in numerous ways without departing from the scope of the present invention.

I claim:
1. In a cinematographic projection apparatus, a device for driving a mechanism comprising:
   a casing;
   a constant speed electric motor suspended to a first pivot secured to said casing, said motor having a shaft carrying a first roller;
   a variable speed electric motor suspended to a second pivot secured to said casing, said variable speed motor having a shaft carrying a second roller;
   a member in the form of a cup having an inner surface and an outer surface and being rotatively mounted in said casing and located to contain said first roller so that said inner surface is capable of being engaged by said first roller upon rocking of said constant speed motor;
   an intermediate roller rotatively mounted about a fixed pivot of said casing, said intermediate roller being in contact with said outer surface of said cup member and being capable of being engaged by said second roller upon rocking of said variable speed motor;
   a pulley driven by said cup member and connected to said mechanism to be driven, and
   control means for rocking either said constant speed motor about said first pivot or said variable speed motor about said second pivot to drive said cup member either internally or externally, respectively.

2. A device according to claim 1, wherein a reverse roller is housed inside said cup-shaped member, whereby said first roller of said constant speed motor when the latter is rocked about said first pivot, engages said cup-shaped member either directly or indirectly through the intermediate of said reverse roller, to drive said cup-shaped member either in one direction or in the opposite direction, respectively.

3. A device according to claim 2, wherein said second pivot is substantially perpendicular to said first pivot, said reverse roller is resiliently mounted in order to be capable of being moved against said cup-shaped member by said first roller when said constant speed motor is rocked about said first pivot, and wherein said constant speed motor carries a fork-like stirrup member, said variable speed motor carries a finger member, and said control means comprises a rod-like member having a longitudinal axis and terminating in a recessed disc and presenting a crank member engaged in said fork-like stirrup member, said rod-like member being capable both of a rotation about its longitudinal axis and of a longitudinal movement along its longitudinal axis, whereby said rod-like member when moved longitudinally rocks said variable speed member through engagement of said disc with said finger member, while said rod-like member when rotated in either direction rocks said constant speed motor in either direction through engagement of said crank member with said fork-like stirrup member.

4. A device according to claim 1 wherein said second pivot is substantially perpendicular to said first pivot.

5. A device according to claim 4, wherein said constant speed motor carries a stirrup member, said variable speed member carries a finger member, and said control means comprise a rod-like member having a longitudinal axis and terminating in a recessed disc capable both of rotation movement about its longitudinal axis and of longitudinal movement along its longitudinal axis, whereby said rod-like member when moved longitudinally rocks said variable speed member through engagement of said disc with said finger member, while said rod-like member when rotated rocks said constant speed motor through engagement with said stirrup member.

6. A device according to claim 1 wherein said constant speed motor drives a fan.

References Cited by the Examiner
UNITED STATES PATENTS 3,166,946  1/1965  Veber _____ 74—207

DAVID J. WILLIAMOWSKY, *Primary Examiner.*

FRANK SUSKO, L. H. GERIN, *Assistant Examiners.*